UNITED STATES PATENT OFFICE.

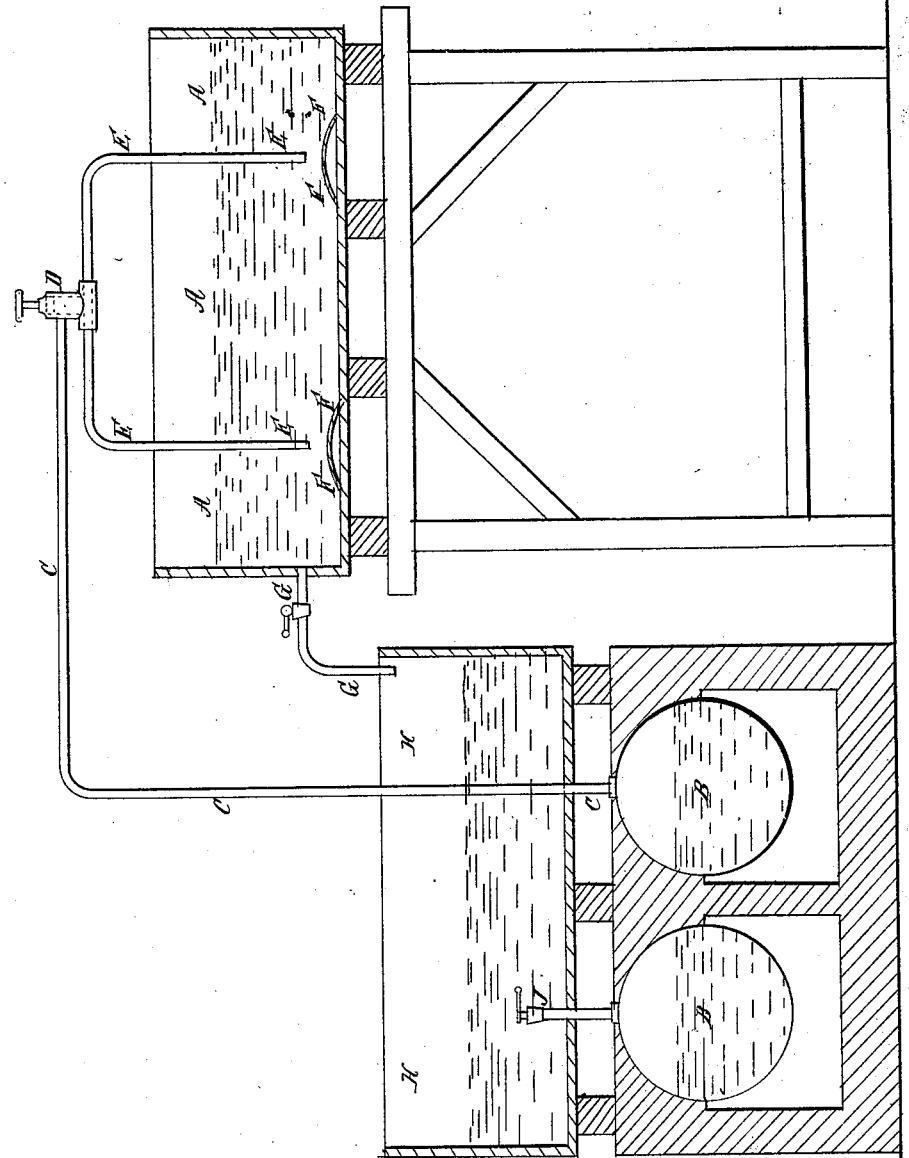

G. C. LOUIS DEGENHARDT, OF TRESCKOW, PENNSYLVANIA.

IMPROVED APPARATUS FOR PURIFYING ACID WATER FOR STEAM-BOILERS.

Specification forming part of Letters Patent No. 33,828, dated December 3, 1861.

*To all whom it may concern:*

Be it known that I, G. C. LOUIS DEGENHARDT, of Tresckow, in the county of Carbon and State of Pennsylvania, have invented certain new and useful Improvements in Purifying Water for Steam-Boilers; and I hereby declare that the following, taken in connection with the accompanying drawing, forms a full, clear, and exact description of the same.

The rapid destruction of steam-boilers in the coal-mining districts of the United States is a source of serious expense and frequent injurious interruptions to mining operations. The cause of this difficulty is the use of the mine water, which, containing a considerable proportion of sulphuric acid, causes the rapid corrosion of the iron steam-boilers. Many attempts have been made to remedy this difficulty by the use of lime, alkaline, and other substances, but so far without entire success.

I have invented a cheap, simple, and efficient method of so purifying the mine water as completely to neutralize the acid it contains, so that it can be used for steam-boilers without corroding or injuring them in the least degree.

My invention consists of the following arrangement of devices, which can with ease be applied to any existing boilers.

The mine water, instead of being pumped direct into the boilers, is first pumped into a tank, A A, placed at a suitable height above the boilers, and of sufficient dimensions to hold three or four times the quantity of water required to fill the boilers.

B B are the boilers, from which a steam-pipe, C C, of about two inches diameter, leads into the tank A A. This steam-pipe C C is provided with a valve, D, below which the pipe is divided into two branches, E E, which terminate about six inches from the bottom of the tank. On the bottom of the tank and directly under the pipes E E convex iron plates F F are fastened, which serve to spread the steam as it is discharged from the pipes E E. At about fifteen to eighteen inches above the bottom of the tank a pipe and cock, G G, is inserted, by means of which the water can be drawn off from the upper tank, A A, into a second and lower tank, H H.

J is a pipe and cock inserted into the lower tank about twelve inches above the bottom, and by means of which the water is fed into boilers B B.

When the apparatus is intended to operate, a certain quantity of slaked lime is thrown into the upper tank, A A. The quantity varies according to the size of the boilers to be supplied with water, also with the quality of the water and that of the lime; but by the test explained below the proper quantity for each particular case can with ease and accuracy be determined. For an ordinary sixty-horse engine ten to twelve bushels will suffice. The steam is then let on through the pipe C C, and the branch pipes E E, which causes the lime to become thoroughly mixed with the water, which by the heat of the steam is soon raised to a high temperature, which, together with the effectual stirring up of the lime by the escaping steam, causes the prompt and complete neutralization of the acid in the water. This is readily tested by dipping into the water a slip of litmus paper, which will immediately turn red if the acid has not been completely neutralized, but will retain its blue color as soon as the water is entirely free from acid. The moment this is ascertained the steam is shut off and the lime allowed to settle until the water becomes quite clear, when it is drawn off into the lower tank, whence it is fed into the boilers through the pipe J J, which, being inserted some ten or twelve inches above the bottom of the lower tank, permits any free remnant of lime or other impurity that may yet be in the water to settle to the bottom without being fed into the boiler.

The operation of stirring the water and lime in the upper tank by means of the steam is repeated from time to time, so as always to have sufficient pure water to keep the lower tank filled. Ten to twelve bushels of lime will last from one to two weeks, when a fresh supply is necessary. From time to time the lime that has accumulated at the bottom of the upper tank, and any that may have settled to the bottom of the lower tank, after having served the purpose of purifying the water, is removed and may be advantageously employed as a fertilizer for agricultural purposes.

The loss of steam from the boilers is compensated by the heating of the water in the tanks before feeding it into the boilers. In this manner also all inconvenience from the freezing of the water in the tanks in the winter is entirely prevented.

I am aware that mine water has been neutralized by means of lime or other alkaline solution; also that mine water was rendered fit to be used in steam-boilers by an expensive process of purifying and filtering it, necessitating costly apparatus. I therefore do not claim, broadly, the use of lime in combination with acidulous mine water, nor yet the purifying or filtering of such mine water by any process or apparatus heretofore in use; but What I do claim as my invention, and desire to secure by Letters Patent, is—

The combination of apparatus, substantially as herein described, to operate in the manner and for the purposes set forth.

In testimony whereof I have signed my name to this specification before two subscribing witnesses.

G. C. LOUIS DEGENHARDT.

Witnesses:
 M. M. DIMMICK,
 T. L. FOSTER.